Patented Oct. 28, 1941

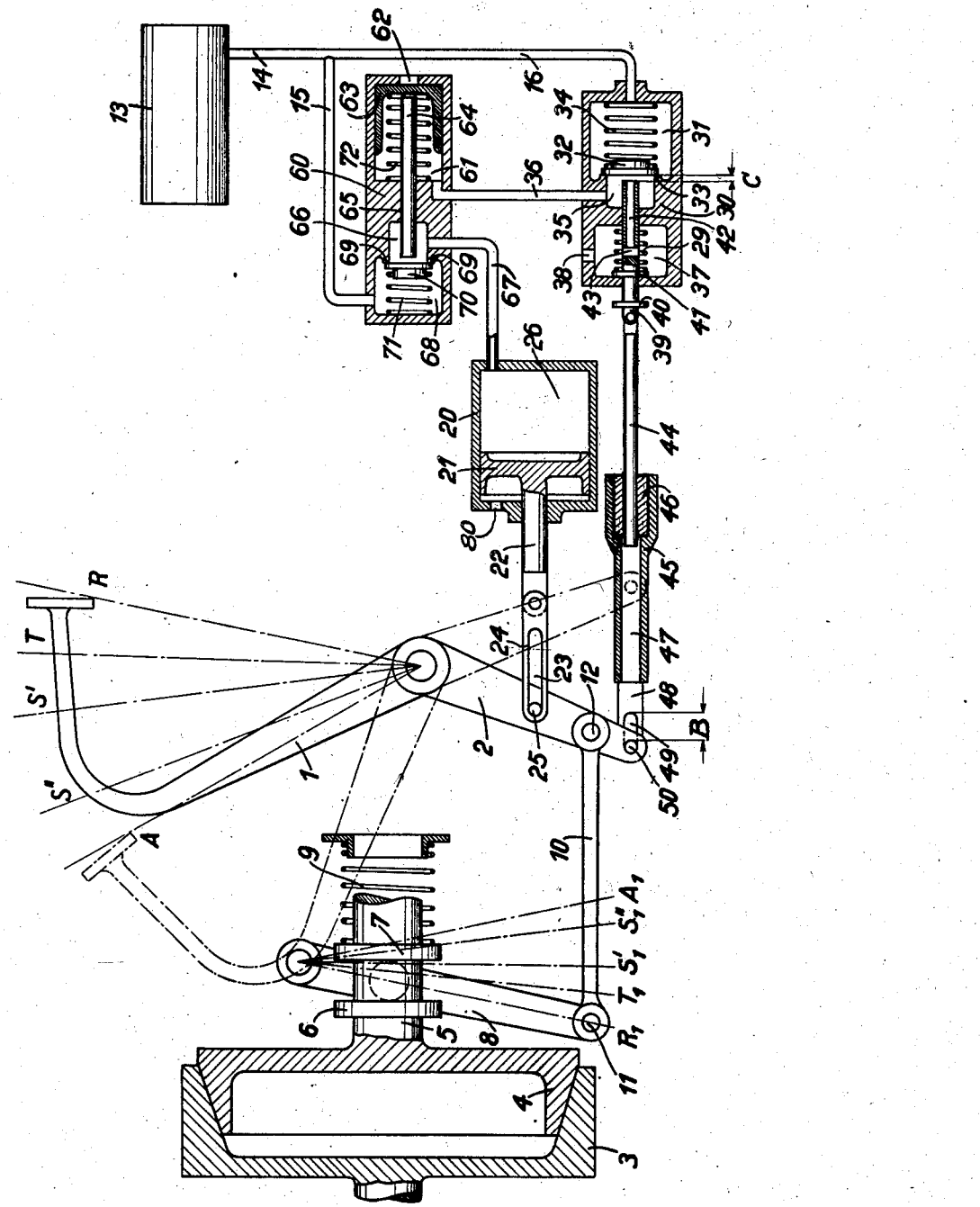

2,260,280

UNITED STATES PATENT OFFICE 2,260,280

CLUTCH OPERATING DEVICE FOR MOTOR VEHICLES

Carl Böttner, Friedrichshafen, Germany, assignor to Maybach-Motorenbau G. m. b. H., Friedrichshafen, Germany Application August 30, 1938, Serial No. 227,553
In Germany September 1, 1937

9 Claims. (Cl. 192—91)

This invention relates to a device for engaging and disengaging clutches such as used in motor vehicles involving a dual arrangement which provides for manipulation of the clutch by the driver and also through servo power mechanism under control of the driver.

An important object of the invention is to provide a dual operating device of the character described in which the driver operating means, which usually will comprise a foot pedal serving to directly actuate the clutch, also controls operation of the power operating means in such manner that where conditions render it desirable the clutch may be directly actuated by the driver instead of by servo motor mechanism.

It is evident, of course, that where the power mechanism is controlled by the driver through a separate pedal than employed to directly actuate the clutch no difficulty will be experienced in actuating the clutch directly or through the power mechanism at will. Where, however, a single driver operating member, a pedal, is used a problem arises in that actuation of the operating member to directly actuate the clutch will ordinarily affect the servo motor control so as to cause the motor to act on the clutch at times when the driver desires to manipulate the clutch at a fast or slow rate, or in interrupted stages, in accordance with existing conditions.

In cases where no servo mechanism is provided and the clutch is actuated directly by the driver by a control member such as a foot pedal through mechanical linkage, it is possible for the driver at all times to regulate the pressure on the clutch and control the rate of engagement or disengagement of the clutch in accordance with the resistance of the vehicle to movement, the vehicle speed, etc. Ordinarily the clutch can be released rapidly without undesirable effects, but the ability to control actuation of the clutch in accordance with varying conditions is extremely desirable during reengagement in order to avoid injury to the clutch and the vehicle motor as well as to avoid annoying jerks.

While the use of servo motor devices for actuating the clutch is well known the control mechanism regulating their operation could not be so manipulated by the driver as to regulate the relative movement of the clutch parts in accordance with the judgment of the driver so as to momentarily interrupt, slow down, or speed up the traverse of one clutch part between its position of engagement and position of complete disengagement. While hitherto a servo motor device could be initially adjusted to actuate the clutch rapidly or slowly, the speed of movement would be the same at all times and was not subject to variation. Also, once the motor mechanism under initiation of the driver began to operate it would move the clutch through its complete traverse between disengaged and engaged positions, and if the driver attempted to interrupt operation in the motor momentarily during traverse from disengaged to engaged clutch positions the motor would reverse itself so as to cause the clutch to again become completely disengaged.

It will be obvious for the reasons indicated that while the employment of an auxiliary power device for actuating the clutch dispensed with the necessity of the driver exerting any substantial pressure the manipulation of the clutch cannot be controlled and varied as where the clutch is directly manipulated by the driver. The employment of a common control pedal which serves to directly actuate the clutch as well as control operation of a servo motor device of itself does not solve the difficulty or enable the driver to achieve a "soft" engagement of the clutch in accordance with the "feel" of the clutch.

The device of the present invention involves a direct acting mechanical arrangement and a servo motor operator for the clutch, both manipulatable by the driver through a common lever, or pedal, so arranged that after the servo motor has become active and moved the clutch through a portion of its traverse between disengaged and engaged positions its operative movement may be interrupted and further movement of the clutch parts effected through the direct acting mechanism subject to manipulation by the driver in accordance with his judgment.

In the combination arrangement of the invention lost motion mechanism is employed where necessary to enable the clutch to be manually manipulated regardless of the operative position of the servo motor, and to prevent undesired actuation of the servo motor control during direct actuation of the clutch by the driver. As a further feature of the invention special mechanism is employed between the common actuating pedal and the servo motor control whereby initial movement of the pedal from any starting position serves to actuate the control while permitting further movement of the pedal independently of the control, and whereby upon reversing the direction of movement of the pedal the motor control is immediately reversely actuated. It is possible through the inventive arrangement to effect engagement and disengagement of the clutch solely through the servo motor mechanism. It is also possible to interrupt operation of the servo motor mechanism at an intermediate stage by temporarily bringing the direct actuating mechanism into operation and then later allowing the servo motor mechanism to complete the engagement of the clutch. Still further, it is possible after interrupting operation of the servo motor at an intermediate stage to control further manipulation of the clutch towards its engaged position through the direct acting mechanism under the pressure, continuously or intermittently diminishing, exerted by the driver.

In the drawing is shown more or less diagrammatically one embodiment of a clutch operating device embodying the principle of the invention, certain of the main operating parts being shown in longitudinal section.

The common driver actuated control member will preferably comprise the foot pedal 1 which is pivotally mounted for swinging movement in the usual manner. A clutch actuating lever 2 is mounted rigidly with pedal 1. The clutch is indicated as comprising part 3 formed in the motor fly wheel and part 4 on shaft 5 which in its forward position engages part 3 and is movable rearwardly out of engagement therewith against the force exerted by the clutch spring 9. A collar on shaft 5 provided with flanges 6 and 7 is engaged by an arm 8, the latter being pivotally supported for swinging movement at its upper end. Link 10 is pivotally connected at its left end through pin 11 to the lower end of arm 8 and its right end through pin 12 to the clutch actuating arm 2. Movement of pedal 1 from its full line towards its dotted line position swings arm 2 to the right and such movement is transmitted through link 10 and arm 8 to disengage the clutch directly under the actuation of the pedal.

The power mechanism for actuating the clutch may be of any known type, fluid pressure or vacuum operated, etc., and a control therefore will be provided responsive to movement of the pedal member 1. In the embodiment shown a vacuum type servo device is employed as the power means for disengaging the clutch, the same comprising a cylinder 20 having an operating piston 21. The piston rod 22 of the motor may be caused to act on lever 2 which as above explained is actuatable by pedal 1. To this end piston rod 22 is pivotally connected with a short arm 24 having a longitudinal slot 23 providing a lost motion connection with pin 25 on lever 2. The provision of such lost motion device enables lever 2 to be swung rearwardly to disengage the clutch independently of the servo motor.

The servo motor is supplied with vacuum from a source 13 which can conveniently comprise the intake manifold of the vehicle motor. Vacuum supply line 14 has a branch 15 leading to chamber 68 of a fluid actuated valve device 60, a control valve 70 is held against its seat 69 by a spring 71, and when open such valve establishes communication between chamber 68 and chamber 66, which latter chamber connects with the chamber 26 of the servo motor through line 67. When a vacuum is created in chamber 26 of the motor piston 21 moves to the right, thus swinging lever 2 to the right and causing the clutch to be disengaged through the operating linkage heretofore described.

The supply of vacuum to the servo motor is controlled through pedal 1 through special control mechanism, including valve 70 which has already been referred to. The control mechanism includes a valve housing 30 in whose right hand chamber 31 is a valve 32 yieldingly held on its seat 33 by spring 34. Chamber 31 receives vacuum from source 13 through branch line 16. Valve 32 is actuatable by rod 39 slidably supported in a bore in valve housing 30 and provided with a pair of spaced stops 40 and 41 adapted to limit movement of the rod. In chamber 37 in the left portion of housing 30 through which rod 39 extends is a spring 29 which yieldingly holds rod 39 in its left end position as determined by stop 41. Rod 39 is provided with an axial bore 42 in communication with chamber 37 through a cross bore 43 and, communicating with the atmosphere through port 38. When rod 39 is in its left position as shown small chamber 35 to the left of valve 32 is vented to the atmosphere, and when rod 39 moves to the right the end of bore 42 is sealed by engagement with valve 32 so that upon opening of valve 32 through further traverse of rod 39 to the right a vacuum is established in chamber 35.

Rod 39 is actuated in response to movement of pedal 1, in the present case through special mechanism connecting with lever 2, with which the servo motor 20 also connects. Rod 39 is pivotally connected to rod 44 which at its left end is received in a hollow rod 45 having an arm 48 connected with pin 50 on arm 2 through a short slot 49 which provides for lost motion permitting a certain degree of movement of arm 2 independently of arm 48.

By reason of the limited degree of movement of rod 39 permitted by stops 40 and 41 it is evident that arm 2 must be capable of a substantially greater traverse than rod 39. Still it is important according to the invention that initial movement of pedal 1 in either direction should be capable of immediately moving rod 39 in one or the other directions to open or close valve 32. A frictional connection is therefore provided which enables arm 32, immediately upon takeup of the lost motion provided by slot 49, to actuate rod 39 to the limits determined by stops 40 and 41 and thereafter to move to a new position as lever 2 is further moved. The frictional connection is provided by bushing 46 at the right end of hollow rod 45, which bushing frictionally engages rod 44. Bushing 46 has a sufficiently high coefficient of friction to cause movement of rod 44 against spring 29 which acts on the right hand stop 41 of rod 39. Assuming that lever 2 through the frictional connection has caused movement of rod 39 to the right and stop 40 engages valve housing 30, rod 44 during further traverse of lever 2 to the right will slide in bushing 46 through bore 47 of hollow rod 45. When lever 2 thereafter moves to the left spring 29 will urge rod 39 to its left end position to effect closing of valve 32.

The vacuum entering chamber 31 of valve housing 30 through line 16 is transmitted, when valve 32 is opened through the mechanism just explained, through chamber 35 and line 36 to the right hand chamber 61 of valve housing 60 in which chamber is a piston 63 yieldingly held in its right hand position by spring 72 and subject to atmospheric pressure at its right end through port 62. When a vacuum condition is created in chamber 61 piston 63 moves to the left, and acts through rod 64 to open valve 70, thus allowing vacuum to be supplied through lines 14 and 15, chambers 68 and 66, and line 67 to chamber 26 of the servo motor 20. The motor thereupon moves lever 2 to the right and disengages the clutch.

When the pedal is reversely moved from its depressed position and rod 39 is moved to the left, valve 32 closes and piston chamber 61 in housing 60 is vented to the atmosphere through line 36, chamber 35, bores 42 and 43, chamber 37 and port 38. Piston 64 under the action of spring 72 moves to its right end position, causing valve 70 to be closed by spring 71. Chamber 26 of the servo motor will thereupon be vented to the atmosphere. This can be accomplished either merely through leakage of air into chamber 26 through port 80 and around piston 21, or through the provision of a venting arrangement such as bores 42 and 43 which vent chamber 61 of piston 63. Clutch spring 9 will thereupon cause the clutch parts to engage.

While the detailed operation of the various parts have been individually described the correlative operation of the different parts may be more fully understood by reference to what occurs in different positions of pedal 1. Referring to the drawing a series of lines are superposed on pedal 1 to indicate the positions thereof corresponding to different relative positions of the clutch parts 3 and 4. R indicates the rest, or released, position of the pedal, at which time the clutch parts are fully engaged. The corresponding position of clutch arm 8 is indicated by $R_1$. T indicates the position to which pedal 1 is moved without any movement of the clutch parts due to lost motion existing in the linkage connecting the pedal to the movable clutch part 4, and $T_1$ represents the corresponding position of clutch arm 8. In moving from position T to position S' pedal 1 through lever 2, link 10 and arm 8 begins to move clutch part 4 to the right and the clutch begins to slip slightly. By the time the pedal has been moved to position S'' slippage no longer occurs and the clutch has become fully disengaged. Further movement of the pedal from position S'' to its fully depressed position A provides a safety factor to insure complete disengagement of the clutch regardless of its condition of wear, and serves a further useful purpose hereafter to be explained. The positions of arm 8 corresponding to pedal positions S', S'' and A are indicated at S', $S''_1$, and $A_1$.

All of the parts are shown in the positions which correspond to full engagement of the clutch. When the driver moves clutch pedal 1 from rest position R, and it is assumed for the moment that the servo motor mechanism is not present, first the lost motion between parts 2, 10, 8 and the clutch is taken up as the pedal moves to position T. In moving from position T to S' pedal 1 causes a decrease in the pressure between clutch halves 3 and 4, and compression of clutch spring 9. By the time the pedal has reached the position S' the pressure has been reduced sufficiently that the torque transmitted by the clutch is just insufficient to cause positive engagement between the clutch parts, and such parts begin to slip a little relative to each other. During movement of the pedal from S' to S'' the clutch pressure gradually diminishes further with an increasing degree of slippage between the clutch parts, and by the time the pedal reaches position S'' the clutch parts are entirely free of engagement. The traverse of the pedal between S' and S'' defines the slippage range of the clutch, and position S'' defines the point of complete disengagement. Movement of the pedal from S'' to A does not operatively affect the clutch although causing clutch part 4 to move further away from part 3.

Still disregarding the presence of the servo motor device, and assuming that the clutch is to be reengaged, movement of pedal 1 from A back to S'' brings clutch part 4 to a position where it is just free of clutch part 3. During movement from S'' to S' as foot pressure on the pedal is gradually decreased the clutch parts gradually engage and slip relative to each other to a diminishing extent, and when the pedal reaches position S' the clutch parts slip only slightly. The range between S'' and S is the critical part of the traverse of pedal 1. By releasing the foot pressure more slowly on the pedal, or moving the pedal through this range intermittently, and/or by momentarily moving the pedal a short distance reversely back to the left the driver is able to control the engagement of the clutch in accordance with the vehicle and motor speeds so as to prevent grabbing and insure soft engagement. When the pedal is released slightly past S' the clutch becomes completely engaged, and in moving on to T and finally to its rest position R the pedal no longer affects the clutch.

Considering now the servo motor device and its control means in producing operation of the clutch, we will again assume that pedal 1 is in position R with the clutch fully engaged. In moving from R to T lever 1 first traverses the distance B until pin 50 reaches the right end of lost motion slot 49, and then by reason of the frictional bushing 46 during further movement of the pedal towards T parts 48, 44 and 39 will move as a unit until the right end of rod 39 has traversed distance C. By the time the pedal reaches position T the end of rod 39 just engages valve 32 and through the closing of bore 42 passage 36 and piston chamber 61 are cut off from the atmosphere. Stops 40 and 41 on rod 39 are in an intermediate position.

As the pedal moves from T towards S' rod 39 moves further to the right to open valve 32. When stop 40 engages the end of valve housing 30 rod 39 will move no further and rod 44 will slip relative to rod 45 as the pedal moves lever 2 further to the right. During all this time it will be evident that the servo motor is inoperative, lever 2 being permitted to move relative to piston rod 22 by reason of the lost motion slot 23 in arm 24.

As soon as valve 32 opens during traverse of the pedal to S' vacuum from line 16 acts on piston 63 in chamber 61, and such piston moves to the left to open valve 70. Vacuum from line 15 is then supplied through line 67 to the servo motor, and piston 21 thereof begins to move to the right. Since movement of the pedal towards position S' has caused lever 2 to move to the right and caused pin 25 to assume an intermediate position in slot 23 incident to the initiation of the control mechanism which resulted in vacuum being supplied to the servo motor, piston 21 must first move through a short lost motion distance to again bring the left end of slot 23 into engagement with pin 25 on lever 2. It is assumed that this has occurred and that piston 21 has begun to move lever 2 under force of the vacuum slightly to the right to bring the clutch parts to a position where they begin to slip by the time the pedal reaches position S'. As the piston continues to move the right the clutch parts will be brought to their fully disengaged position corresponding to position S'' of the pedal, since continued movement of lever 2 to the right will continue to maintain valves 32 and 70 open and continue the supply of vacuum to the servo motor, causing piston 21 to reach its right end position when lever 1 reaches the position S". The pedal may be moved on by the driver to its left end position A.

Assuming now that the clutch is to be reengaged, the arrangement is such that the foot pedal may be manipulated to control and vary the clutch pressure without interference from the servo motor mechanism. During the period of complete disengagement piston 21 is in its right end position and lever 2 with pin 25 are in position corresponding to position A of the pedal. During the reverse movement of lever 2 towards the left again rods 45 and 44 being in frictional connection through bushing 46 and under the pressure of spring 29 will move rod 39 to the left until stop 41 assumes the position shown in the drawing. The closing of valve 32 and the venting of piston chamber 61 through bores 42 and 43 and rod 39, and port 38 causes piston 63 to move to the right. Valve 70 closes to discontinue the supply of vacuum to the servo motor. As air leaks into chamber 26 of the motor, lever 2 is moved to the left under the action of clutch spring 9.

As shown in the drawing, servo motor 20 is so proportioned that it moves the clutch operating lever to the point $S_1''$. This effects complete disengagement of the clutch parts but does not move the clutch through the full throw of which it is capable. The clutch operating lever is still capable of movement from $S_1''$ to $A_1$. This corresponds to the movement of the foot pedal from S" to A.

It will be understood that the reverse movement of the clutch is initiated by movement of the clutch pedal from S" toward A, in which range the clutch pedal is free to move back toward S", and thereby to close valve 32.

The movement of the clutch pedal beyond the limit to which it is moved by the servo motor and back again may be carried out under the momentum the clutch pedal has received by the action of the servo motor, or the operator can so manipulate the pedal when it is desired to engage the clutch.

The rapid reengagement of the clutch as the clutch motor piston moves to the left can be interrupted and modified through manipulation of the foot pedal, without causing vacuum to be again supplied to the servo motor which would reversely move the parts back to their completely disengaged position, by reason of the provision of lost motion in the parts between lever 2 and valve 32.

According to the invention slot 49 in arm 48 is made relatively long and stop 41 is so positioned on rod 39 that the combined distances B and C which represents the lost motion between lever 2 and valve 32 constitute as large as possible a part of the slippage range of the clutch represented by the distance between positions S' and S" of the pedal. If, therefore, when the servo motor is venting and the clutch parts are moving towards engagement, with pedal 1 in a position between S" and S', the foot of the driver be caused to hold the pedal stationary or depress the same slightly, such action will be effective upon lever 2 and the mechanical connecting linkage to stop further movement of the clutch parts towards complete engagement, or move them back towards a position of greater slippage, all without actuating valves 32 and 70. It is possible furthermore that the return of the clutch parts to engagement may be directly controlled by foot pressure acting through the mechanical connections so that soft engagement of the clutch can be assured since within the dimensions as represented by the distances B and C the pedal can be manipulated without effecting the control of the servo motor. It will be understood, however, that it is not necessary, once the pedal has been manipulated to discontinue the supply of vacuum to the servo motor for the driver to control the foot pedal since the clutch spring and servo motor as it vents will of themselves assure the clutch parts being brought back to a position of complete engagement.

The embodiment of the invention as shown in the drawing is merely to be taken as illustrative, and the invention is not to be limited further than required by the scope of the appended claims.

I claim:

1. A clutch operating device comprising a servo motor for disengaging the clutch and control means therefor, an operating pedal positively operatively connected directly to the clutch so as to be simultaneously movable with the clutch at all times, said pedal also being operatively connected to the motor control means, and means for effecting movement of the foot pedal relative to and independently of the motor control means to provide for manipulation of the clutch independently of the servo motor by the foot pedal.

2. A clutch operating device comprising a servo motor for disengaging the clutch and control means therefor, direct mechanical means for operating the clutch by foot pressure, a common operating pedal positively connecting with the motor control means and said mechanical means, and lost motion means operative during a part of the complete movement of the clutch from disengagement to engagement for preventing actuation of the motor means and motor control means by the pedal and providing for manipulation of the clutch by the pedal through the mechanical means.

3. A vehicle clutch operating device comprising a clutch actuating lever, driver actuated means for manually operating said lever and being simultaneously movable at all times with said clutch lever, motor means for actuating said lever, connecting means between the motor means and lever providing for movement of the lever by the driver actuated means independent of movement of the motor means, control means for said motor means responsive to movement of said driver actuated means, and connecting means between the driver actuated means and the control means providing for actuation of the lever in a limited range by the driver actuated means without actuation of the control means.

4. A vehicle clutch operating device comprising a clutch actuating lever, driver actuated means for operating said lever directly under force applied by the driver, said means being positively connected to the clutch operating lever and simultaneously movable at all times therewith, motor operating means for the clutch lever controlled by the driver actuated means, and a lost motion connection between the motor actuating means and the clutch actuating lever providing for operation of the clutch actuating lever by the driver actuated means independently of the motor operating means.

5. A vehicle clutch operating device comprising a clutch actuating lever, a pedal, means positively connecting the pedal to the clutch lever for actuation thereof directly by force exerted by the driver on the pedal and rendering the pedal and lever simultaneously movable at all times, motor operating means for the clutch lever, a lost motion connection between the motor operating means and clutch lever providing for actuation of the clutch lever by the pedal independently of the motor means, control means for the motor means actuatable by the pedal and responsive to movement of the pedal from different positions to render said motor operative and inoperative.

6. A vehicle clutch operating device comprising a clutch actuating lever, a pedal, means rigidly connecting the pedal to the clutch lever for actuation thereof directly by force exerted by the driver on the pedal, motor operating means for the clutch lever, a lost motion connection between the motor operating means and clutch lever providing for actuation of the clutch lever by the pedal independently of the motor means, control means for the motor means actuatable by the pedal, a lost motion connection between the pedal and motor control means providing for limited movement of the clutch lever by the pedal independently of the motor operating means, and friction means between the pedal and motor control means in series with the last said lost motion connection operative under movement of the pedal in either direction to cause the pedal to actuate the motor control means.

7. A vehicle clutch operating device comprising a clutch operating lever, a pedal, means rigidly connecting the clutch lever to the pedal for actuation of the lever directly by force applied by the driver to the pedal, motor operating means for the clutch lever, control means for said motor means actuatable by the pedal, a lost motion connection between the motor means and the clutch lever providing for movement of the clutch lever independently of the motor means, and a lost motion connection between the motor control means and the pedal allowing limited movement, less than the lost motion provided by the connection between the clutch lever and motor means, of the pedal independently of the control means.

8. A vehicle clutch operating device comprising a clutch actuating lever, a pedal actuating member directly connecting with the lever, a motor operator connecting with the lever through a lost motion connection providing for movement of the lever independently of the motor means, motor control means connected to the lever and actuatable by the pedal member, a lost motion connection providing for limited movement of the lever by the pedal independently of the motor control means, and a friction connection between the lever and motor control means providing for actuation of the motor control means upon movement of the pedal from any adjusted position and operative after actuation of the motor control means to cause the pedal to move independently of the motor control means.

9. A clutch operating device comprising a servo motor, a pedal reversely movable in a path between two spaced end positions, means rigidly connecting the pedal and clutch, connecting means between the servo motor and clutch including a lost motion connection providing for movement of the clutch independently of the servo motor, control means for the motor responsive to movement of the pedal in one direction from any position in its path to cause the motor to engage the clutch, a lost motion connection between the pedal and control means providing for limited movement, less than the complete distance between the two end positions, of the pedal independently of the motor control means, the pedal being operable in either direction over a limited range determined by its lost motion connection with the motor control means to regulate reengagement of the clutch through its rigid connection with the clutch, and being operable when moved in one direction beyond said limited range from any position in its path to actuate the control means and cause the motor to disengage the clutch.

CARL BÖTTNER.